(12) United States Patent
Elkington et al.

(10) Patent No.: US 8,635,420 B2
(45) Date of Patent: Jan. 21, 2014

(54) RESILIENT MIRRORING UTILIZING PEER-TO-PEER STORAGE

(76) Inventors: Susan Elkington, Colorado Springs, CO (US); Michael Walker, Colorado Springs, CO (US)

( * ) Notice: Subject to any disclaimer, the term of this patent is extended or adjusted under 35 U.S.C. 154(b) by 214 days.

(21) Appl. No.: 13/189,238

(22) Filed: Jul. 22, 2011

(65) Prior Publication Data

US 2012/0030422 A1 Feb. 2, 2012

Related U.S. Application Data

(60) Provisional application No. 61/366,903, filed on Jul. 22, 2010.

(51) Int. Cl.
*G06F 13/00* (2006.01)
(52) U.S. Cl.
USPC .......................................................... 711/162

(58) Field of Classification Search
None
See application file for complete search history.

(56) References Cited

U.S. PATENT DOCUMENTS

| | | | |
|---|---|---|---|
| 6,073,218 A * | 6/2000 | DeKoning et al. | 711/150 |
| 6,192,443 B1 | 2/2001 | Mendel | |
| 2005/0210317 A1 * | 9/2005 | Thorpe et al. | 714/6 |
| 2008/0005614 A1 | 1/2008 | Lubbers et al. | |
| 2009/0006716 A1 | 1/2009 | Lubbers et al. | |
| 2011/0087787 A1 | 4/2011 | Lubbers et al. | |

* cited by examiner

*Primary Examiner* — Doc Doan
(74) *Attorney, Agent, or Firm* — Mitchell K. McCarthy (57) ABSTRACT

An apparatus and associated method including a first storage device and a second storage device, each coupled to a remote server independently of the other via a network. Resilient mirroring logic is stored in each of the storage devices that establishes a peer-to-peer communication connection with the other storage device in response to receiving a data access command from the remote server.

18 Claims, 9 Drawing Sheets

RESILIENT MIRRORING UTILIZING PEER-TO-PEER STORAGE

RELATED APPLICATION

This application claims the benefit of the earlier filed application Ser. No. 61/366,903.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. The claimed embodiments are directed to a self-contained intelligent storage element that self-deterministically allocates, manages, mirrors, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY

In some embodiments a self-contained intelligent storage element (ISE) is provided that, in response to receiving a data access command from a remote device via a network connection, executes resilient mirroring processing instructions stored in a memory contained within the ISE to establish a peer-to-peer communication connection with another device that is also coupled in communication with the remote device independently of the peer-to-peer connection with the ISE.

In some embodiments an apparatus is provided including a first storage device and a second storage device, each coupled to a remote server independently of the other via a network. The apparatus further includes resilient mirroring logic stored in each of the storage devices that is executable so that each storage device establishes a respective peer-to-peer communication connection with the other storage device in response to a data access command from the remote server.

In some embodiments a method is provided including steps of obtaining a self-contained intelligent storage element (ISE); receiving a data access command by the ISE from a remote device via a network connection; and in response to the receiving step, executing resilient mirroring processing instructions stored in a memory within the self-contained ISE to establish a peer-to-peer communication connection with another device that is also coupled in communication with the remote device independently of the peer-to-peer connection with the self-contained ISE.

DETAILED DESCRIPTION

"Mirroring" is a term used in the storage industry to describe the process of maintaining copies of data. A mirrored copy of data can advantageously be used when the primary copy is unavailable. One or more mirrored copies of data can also advantageously provide flexibility to a server in balancing the load across a number of controllers operating simultaneously. The present embodiments disclose a structure and operating principle of "resilient mirroring," so named for the benefits that it maintains cache coherency across multiple controllers in real time and in a synchronous manner so as to increase data resiliency and availability.

As described in detail herein, these resilient mirroring embodiments permit a virtual storage space to exist simultaneously in different storage array controllers. That is achieved by the storage-centric structure of the storage array, not employing higher level mirroring software such as a mirror intelligent host driver, a dedicated SAN appliance, or an additional stacked storage controller. The resilient mirroring logic defines data path algorithms that ensure the resiliency and availability benefits of the present embodiments.

Figure 1:
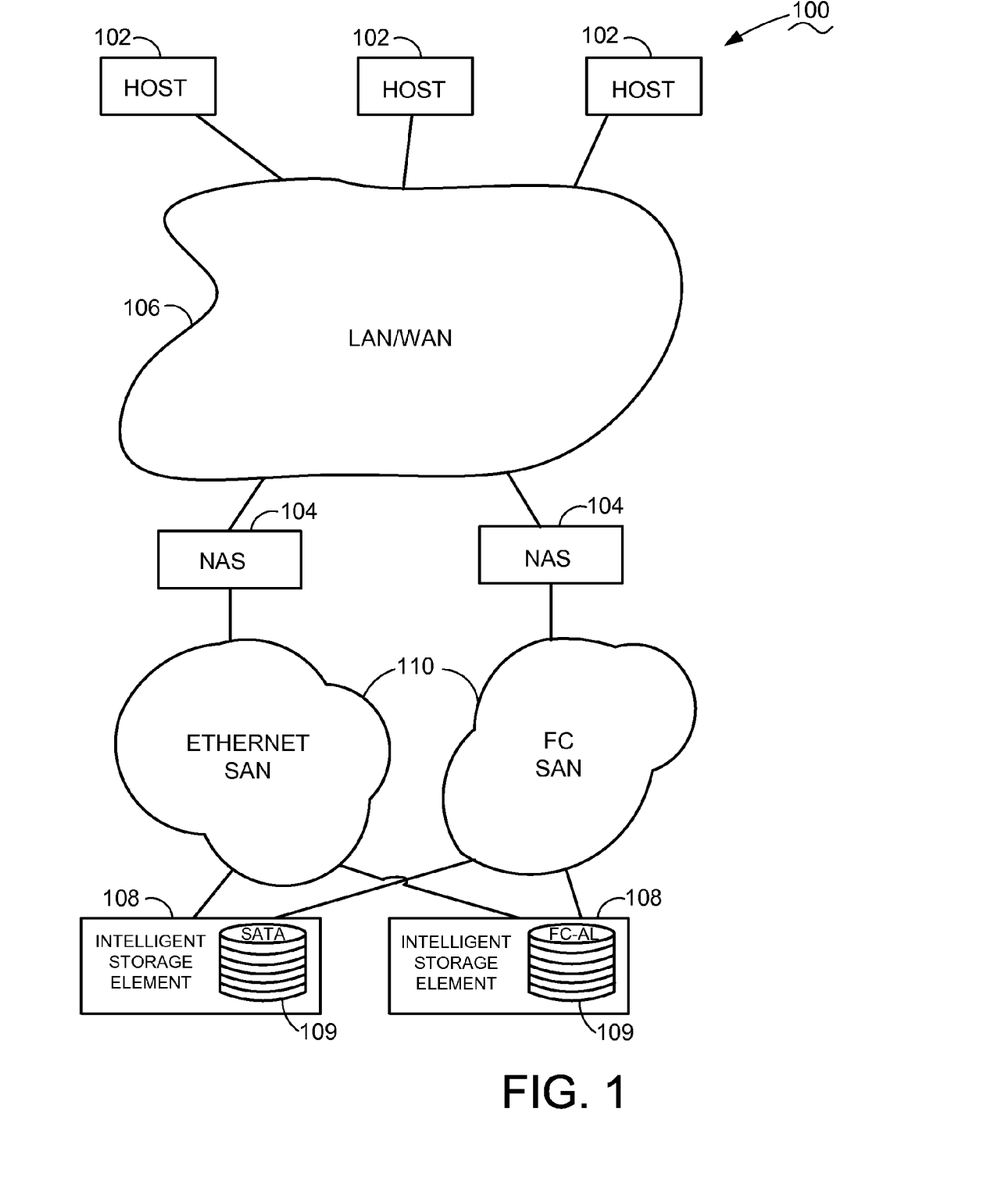
FIG. 1 is a diagrammatic representation of a distributed storage computer system constructed in accordance with embodiments of the present invention.

FIG. 1 is an illustrative distributed storage computer system 100 in which embodiments of the present invention are useful. One or more hosts 102 are networked to one or more network-attached servers 104 via a local area network (LAN) and/or wide area network (WAN) 106. Preferably, the LAN/

WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

Figure 2:
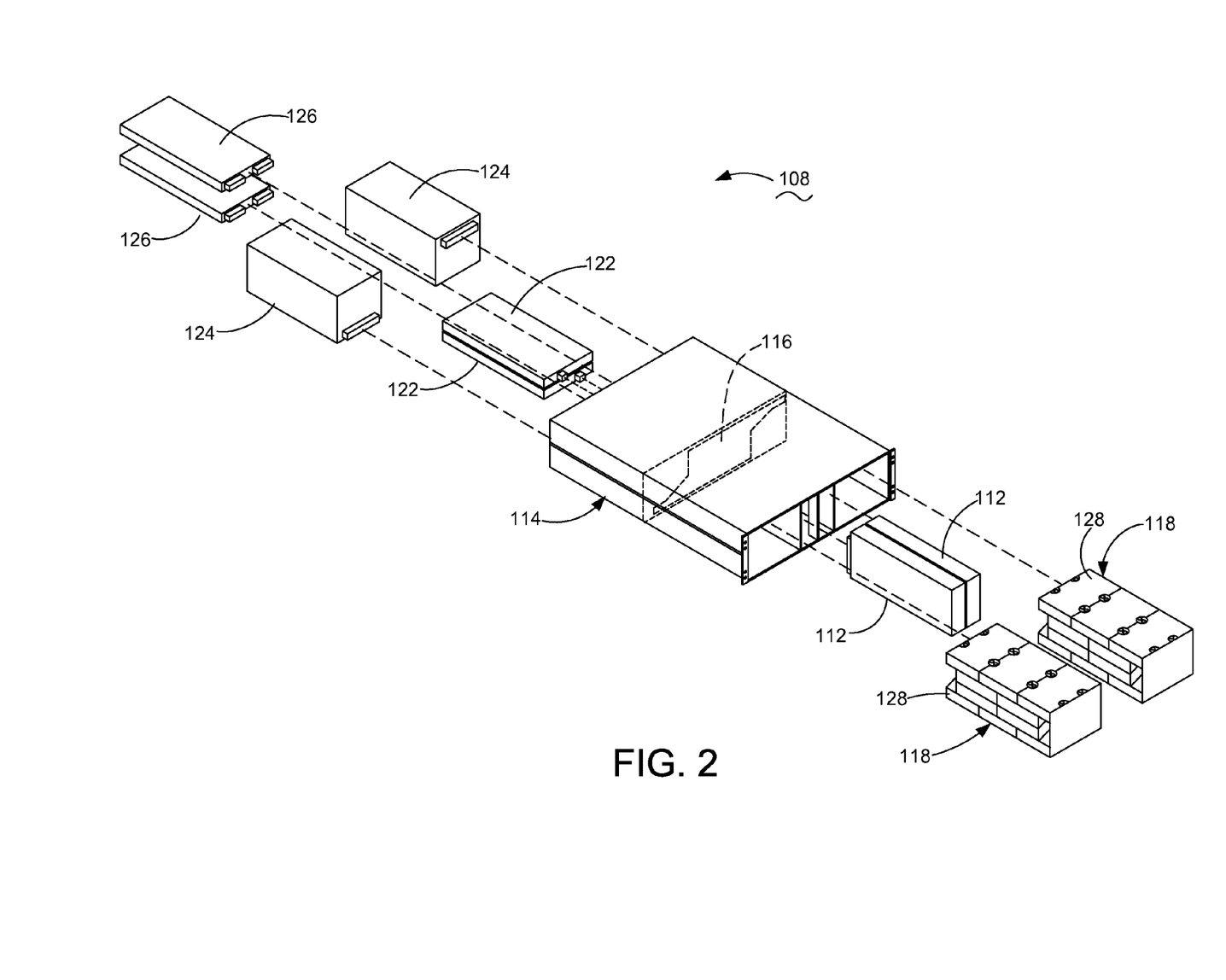
FIG. 2 is an exploded isometric view of an intelligent storage element constructed in accordance with embodiments of the present invention.

The ISEs 108 are each self-contained modules with the necessary on-board intelligence to self-deterministically execute processing instructions to map and manage virtual storage volumes. FIG. 2 illustrates a self-contained ISE 108 constructed in accordance with illustrative embodiments of the present invention. A shelf 114 defines cavities for receivingly engaging dual controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 3:
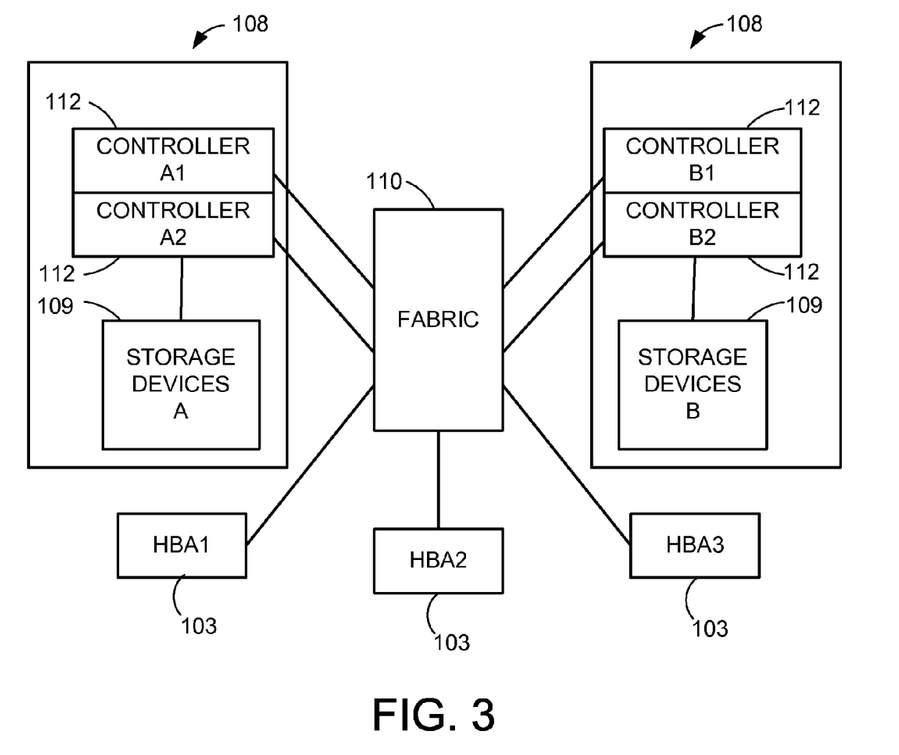
FIG. 3 is a simplified diagrammatic representation of a portion of the computer system of FIG. 1.

FIG. 3 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

Figure 4:
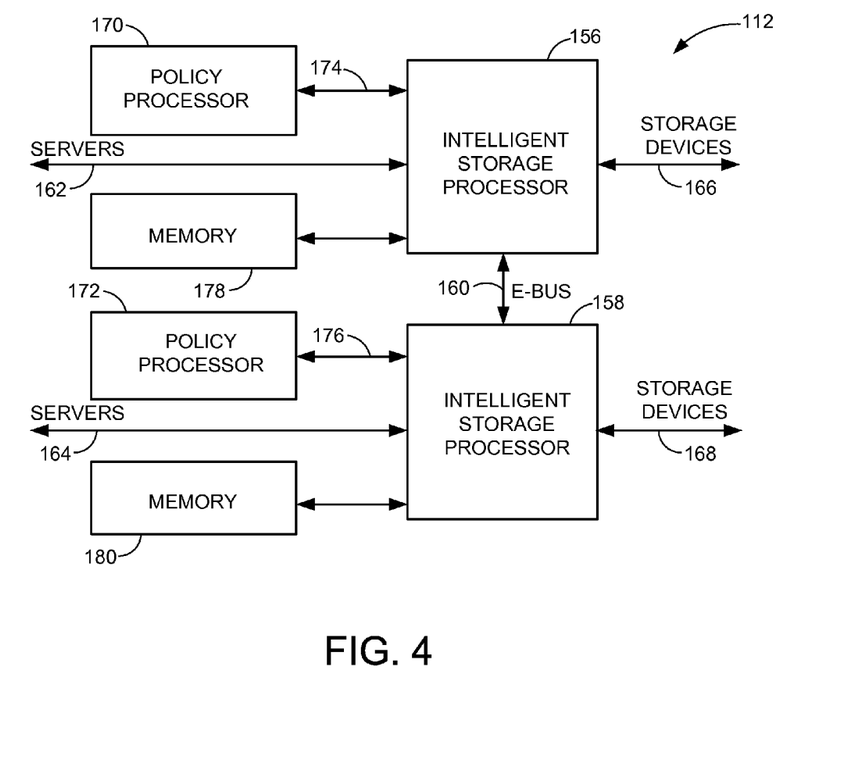
FIG. 4 is a functional block diagram of the array controller in the intelligent storage element.

FIG. 4 depicts the controller 112 architecture as having two intelligent storage processors (ISPs) 156, 158 coupled by an intermediate bus 160 (referred to as an "ebus"). Each of the ISPs 156, 158 is preferably disposed in a separate application specific integrated circuit (ASIC) package on a common controller board. Preferably, the ISPs 156, 158 each respectively communicate with upstream application servers via fibre channel server links 162, 164, and with storage devices making up the storage capacity 109 via fibre channel storage links 166, 168.

Policy processors 170, 172 execute a real-time operating system for the controller 112 and communicate with the respective ISP 156, 158 via peripheral device bus 174, 176. The policy processors 170, 172 can further execute customized logic to perform sophisticated processing tasks in conjunction with the ISPs 156, 158 for a given storage application. The ISPs 156, 158 and the policy processors 170, 172 access memory modules 178, 180 as required during operation.

Figure 5:
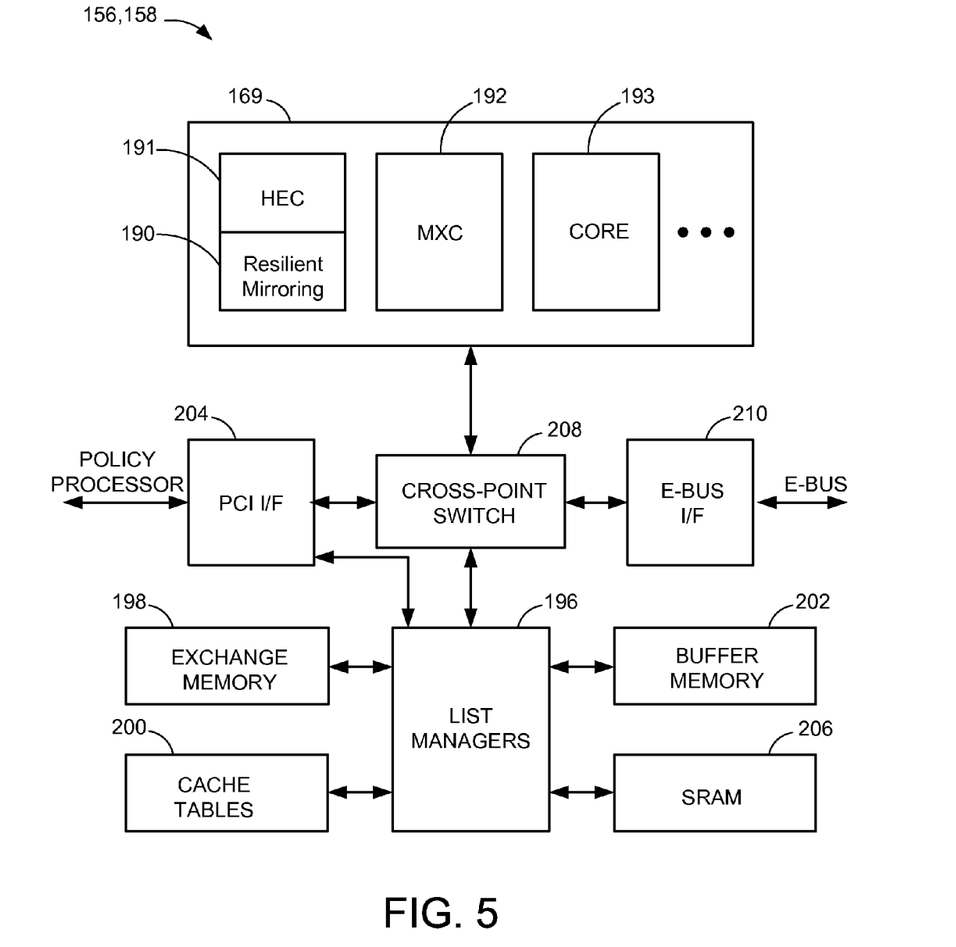
FIG. 5 provides a functional block diagram of an intelligent storage processor in accordance with embodiments of the present invention.

FIG. 5 provides a preferred construction for a selected ISP 156, 158 of FIG. 4. A number of function controllers cores (FCCs), collectively identified at 169, individually and cooperatively manage the operations of the ISE 108. The FCCs 168 are depicted as advantageously including a host exchange controller (HEC) 191, a media exchange controller (MXC) 192, a core controller (CORE) 193, and the like. Although not shown, a number of other controller operations can be so controlled such as direct memory access, exclusive-or, command routing, metadata control, and the like. Each FCC preferably contains a highly flexible feature set and interface to facilitate memory exchanges and other scheduling tasks. In these illustrative embodiments the HEC 191 stores computer instructions in memory defining resilient mirroring data path algorithms 190 that control the structure and operating principles of the claimed invention.

List managers 196 preferably generate and update scatter-gather lists (SGL) during array operation. As will be recognized, an SGL generally identifies memory locations to which data are to be written ("scattered") or from which data are to be read ("gathered").

Each list manager preferably operates as a message processor for memory access by the FCCs, and preferably executes operations defined by received messages in accordance with a defined protocol.

The list managers 196 respectively communicate with and control a number of memory modules including an exchange memory block 198, a cache tables block 200, buffer memory block 202, PCI interface 204 and SRAM 206. The function controllers 169 and the list managers 196 respectively communicate via a cross-point switch (CPS) module 208. In this way, a selected function core of controllers 169 can establish a communication pathway through the CPS 208 to a corresponding list manager 196 to communicate a status, access a memory module, or invoke a desired ISP operation.

Similarly, a selected list manager 196 can communicate responses back to the function controllers 169 via the CPS 208. Although not shown, separate data bus connections are preferably established between respective elements of FIG. 5 to accommodate data transfers therebetween. As will be appreciated, other configurations can readily be utilized as desired.

The PCI interface (I/F) module 204 establishes and directs transactions between the policy processor 170, 172 and the ISP 156, 158. An E-BUS I/F module 210 facilitates communications over the E-BUS 212 between FCCs and list managers of the respective ISPs 156, 158. The policy processors 170, 172 can also initiate and receive communications with other parts of the system via the E-BUS 212 as desired.

The controller architecture of FIGS. 4 and 5 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a stripe during a storage transaction. To enhance processing efficiency and management, data may be mirrored to multiple cache locations within the controller architecture during various data write operations with the array.

Figure 6:
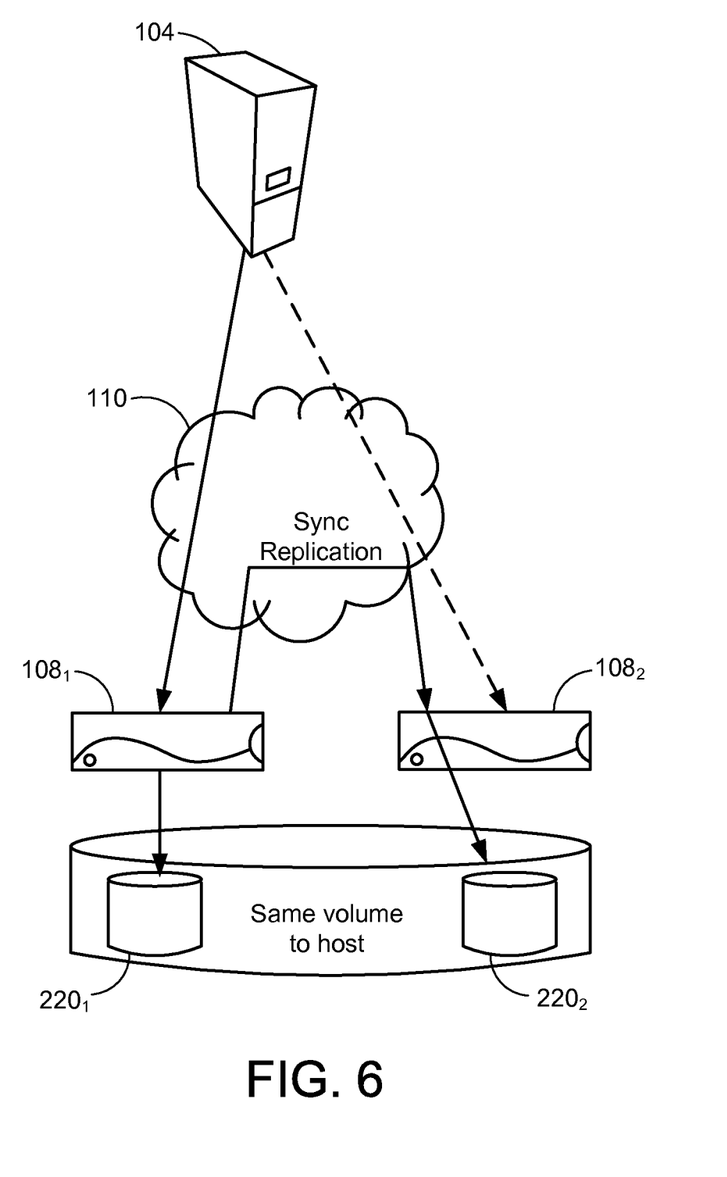
FIG. 6 is a simplified diagrammatic representation of a portion of the computer system of FIG. 1.

FIG. 6 diagrammatically depicts two ISEs $108_1$, $108_2$ constructed in accordance with embodiments of the present invention. Although two ISEs are used for purposes of this description, the claimed embodiments are not so limited in that the skilled artisan readily ascertains that the structures and operating principles described for these two ISEs can cumulatively be extended in like manner to more than two ISEs in equivalent embodiments of the claimed invention.

ISE $108_1$ is presently designated as providing the master controller of a logical unit (LUN) $220_1$ as is denoted by the solid arrow depicting the communication connection between a server 104 and the ISE $108_1$ via the network connection 110. Another self-contained ISE $108_2$ provides a remote controller that manages a mirror copy of the LUN $220_2$ in accordance with the resilient mirroring embodiments of the claimed invention. The designation of ISE $108_1$ throughout the following discussion in no way limits the scope of the contemplated embodiments to some fixed-master orientation once the master controller is designated. Rather, the system is capable of automatically switching the master from a previously designated controller to another controller in the set of mirror storage members in the event of predefined circumstances such as a storage failure or data inaccessibility. Alternatively, a user can override any such predetermined parameters and so designate switching to a different controller designation as the master controller for any reason whatsoever.

Importantly, the server 104 views both LUNs $220_1$, $220_2$ as if they are the same logical volume, advantageously making it possible for the server to transact a data access command with either of the LUNs $220_1$, $220_2$. Cache coherency in the controllers $108_1$, $108_2$ is assured by the resilient mirroring structure and operating principles of the claimed invention.

This structural arrangement provides the server with visibility to all paths for a particular LUN, visible to all array controllers involved in the mirror. The mirror arrangement maintains a single locus of control at all time, such that all data access commands directed to any of the remote controllers is controlled under the auspices of the master controller. The single locus of control ensures data integrity in the event of any data transfer error or device failure. The single locus of control enforces selected rules such as those governing command ordering to avoid complications in the event of crash or failure event with the existence of pending data commands. The single locus of control is implemented at the storage hardware level of the SAN, eliminating the need for extensive overhead at the network and host levels.

In the event that a failure condition causes one of the data images to become unusable or compromised, continued virtual data availability is maintained as the remaining data image(s) are used to support virtual disk operations. A couple of illustrative methods can be used to maintain data availability. First, when one of the storage controllers fails, the host multipathing performs the failover seamlessly with the storage level making a real time determination (via consulting multiple alternate SAN paths) on whether to safely switch the mirror mastership to continue the single locus of control. Second, when an individual LUN fails or has media problems, data is returned to the host from one of the remaining good copies through data forwarding algorithms. When possible, media errors are fixed (re-written) on the problematic LUN copy. This allows the host application to continue with no manual intervention. The data path algorithms account for failures at any level at any time.

The self-contained ISE $108_1$ responds to receiving a data access command from the server 104 via the network 110 by executing the resilient mirroring processing instructions 190 (FIG. 5) to establish a peer-to-peer communication connection with the ISE $108_2$ via a link of the network 110. Again, in these illustrative embodiments the resilient mirroring processing instructions 190 are data path algorithms stored in the HEC 191 and thereby automatically initiated upon receipt of the data access command, be it a read command or a write command. Note that the server 104 is coupled in communication with the remote ISE $108_2$ independently of the peer-to-peer connection that the master ISE $108_1$ establishes with the remote ISE $108_2$.

Figure 7:
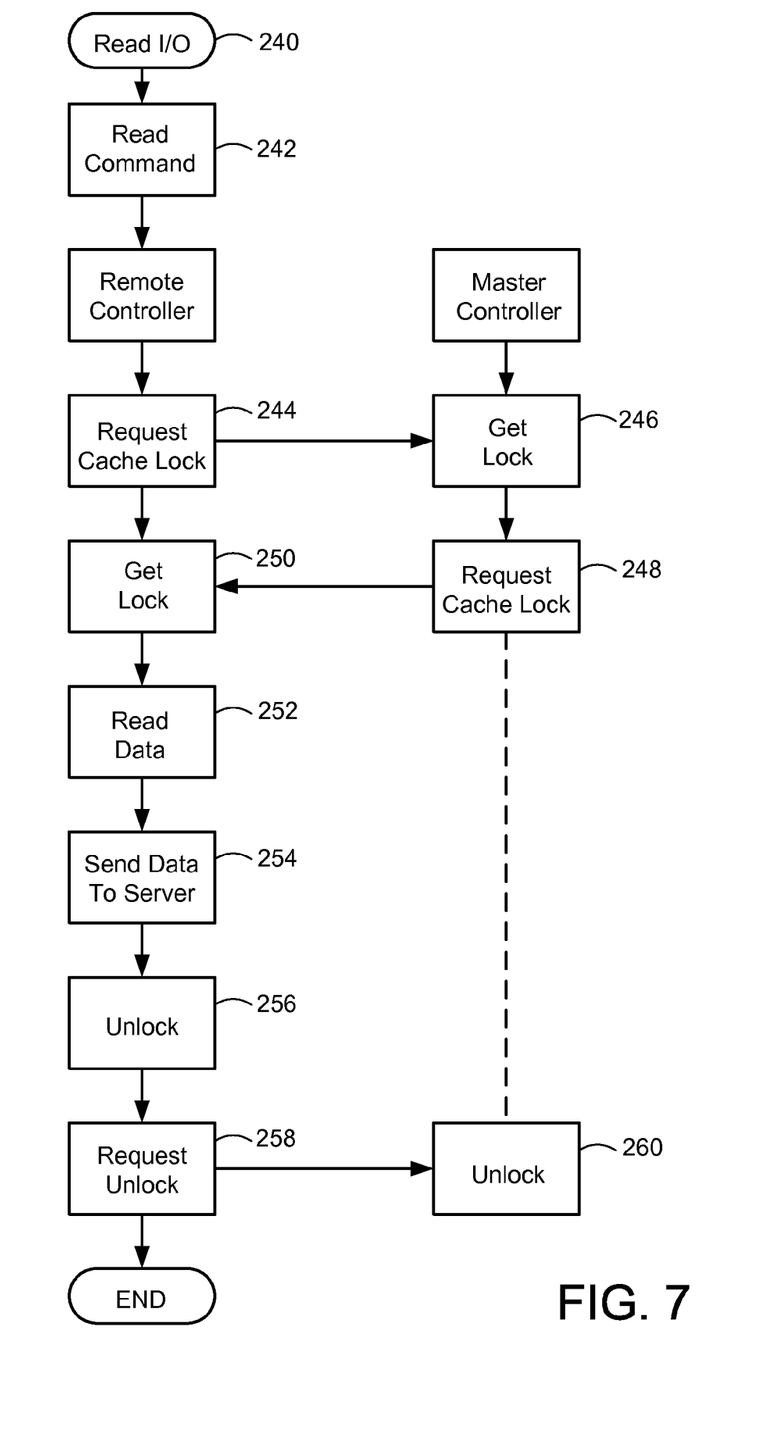
FIG. 7 is a flowchart depicting steps in a method for processing a read command in accordance with embodiments of the present invention.

Still referring to the structural arrangement of FIG. 6, FIG. 7 is a flowchart depicting steps in a method 240 for processing a read command in accordance with the resilient mirroring principles of operation contemplated by the claimed invention. The method 240 begins in block 242 with the server sending the read command in these illustrative embodiments to the remote controller. As discussed, the server can alternatively send the read command to the master controller for it views the same LUN via either controller path. The remote controller receives the read command and initiates execution of the data path algorithms controlling the resilient mirroring principles of the claimed invention.

The remote controller in block 244 sends a cache lock request to the master controller, which in block 246 obtains cache lock and, in turn, sends a cache lock request back to the remote server in block 248. The remote controller obtains cache lock in block 250. This sequence illustrates an operating principle of the resilient mirroring principle, that the master controller in all instances obtains cache lock before any remote controller obtains cache lock.

The method 240 continues in block 252 as the remote controller reads the data corresponding to the read command, and then sends the read data to the server in block 254. The remote server then unlocks cache in block 256 and sends a request to the master controller in block 258 to unlock cache, which the master controller does in block 260.

Figure 8:
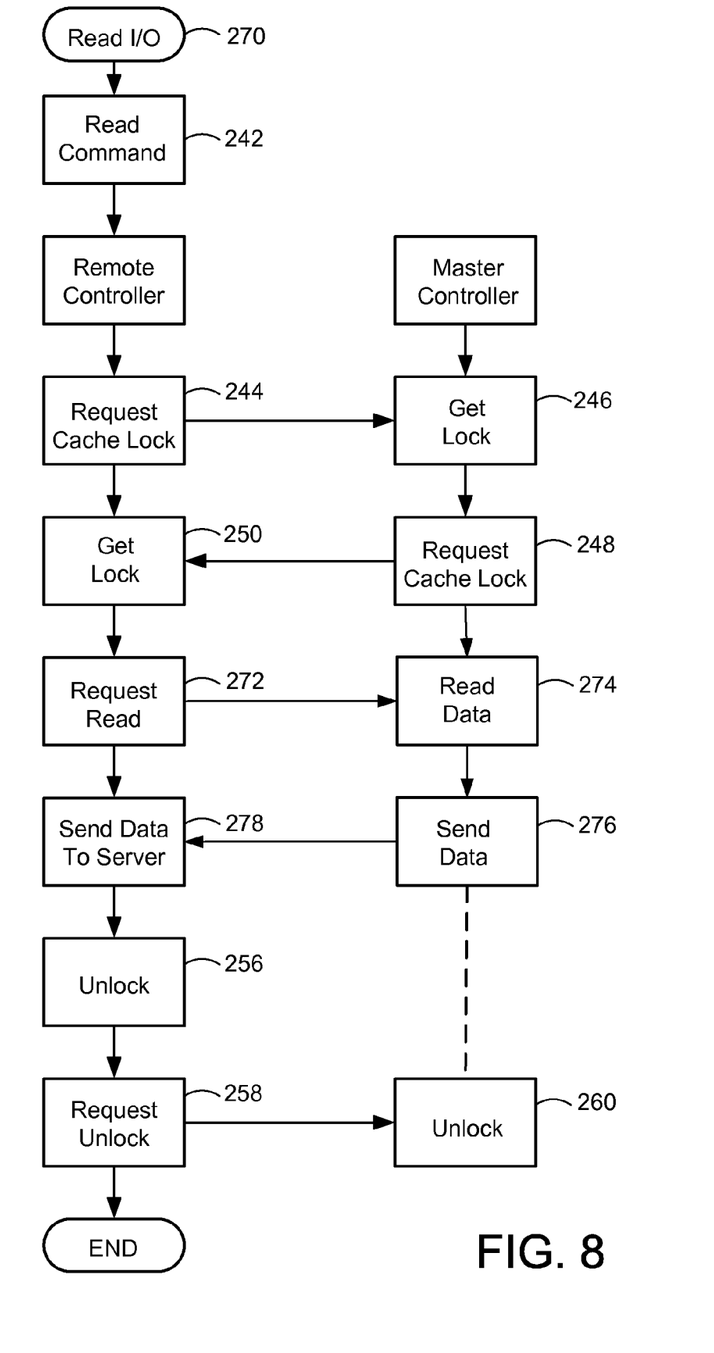
FIG. 8 is a flowchart depicting steps in a method for processing a read command in accordance with embodiments of the present invention.

FIG. 8 is a flowchart similar to FIG. 7 but for depicting steps in a method 270 in response to the server sending a read command for read data that is above the remote controller copy fence. The initial steps of method 270 are the same as those of the method 240 depicted in FIG. 7, and as such they are denoted with like reference numerals. Here, however, after the remote controller obtains cache lock in block 250 it then sends a read request to the master controller in block 272. The master controller reads the read data in block 274 and transfers the read data to the remote controller in block 276. The remote controller, upon receipt of the read data, transfers the read data to the server in block 278. All else is the same as discussed in method 240 depicted in FIG. 7 as denoted by like reference numbers.

Figure 9:
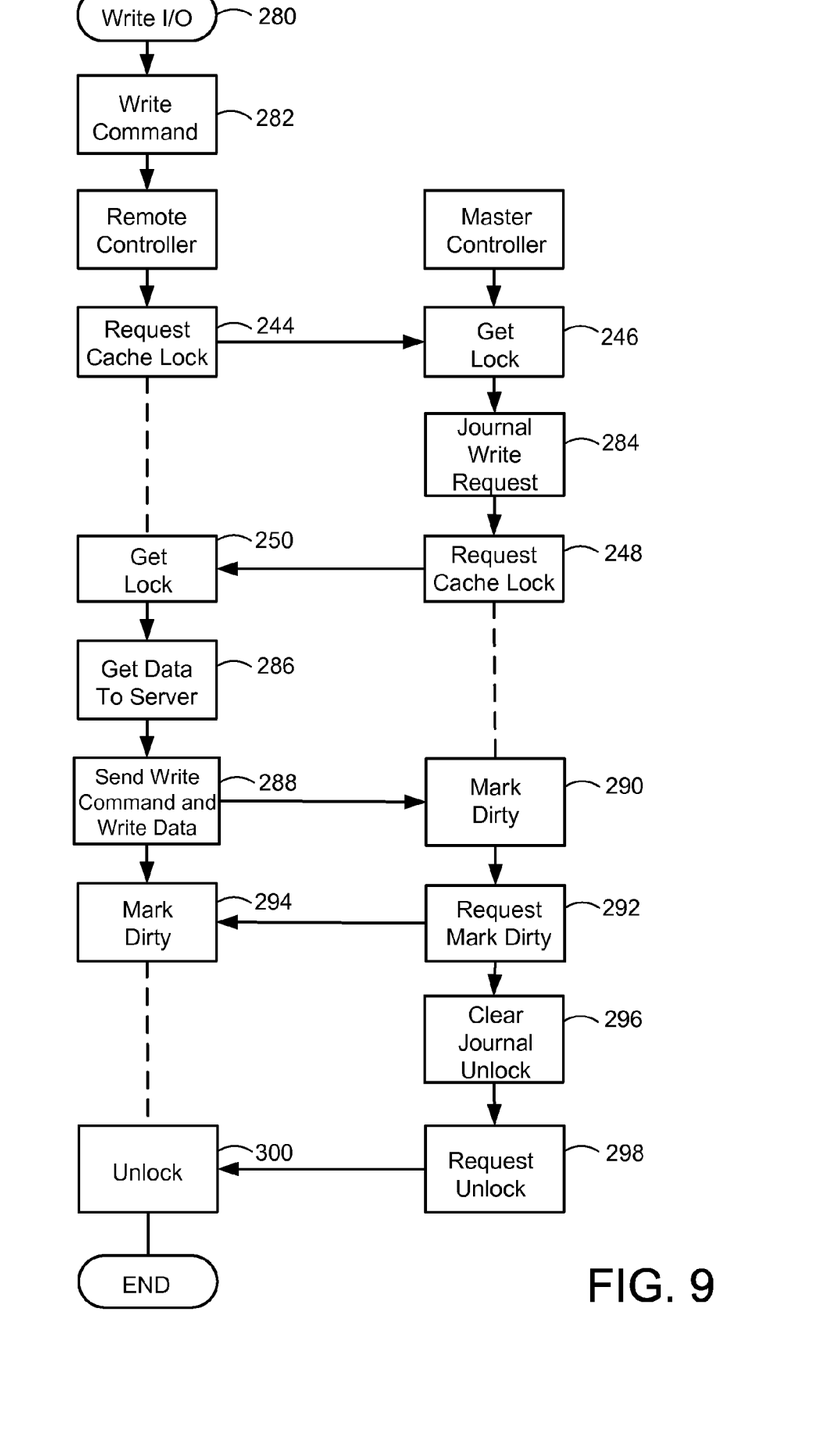
FIG. 9 is a flowchart depicting steps in a method for processing a write command in accordance with embodiments of the present invention.

FIG. 9 is a flowchart depicting steps in a method 280 for processing a write command in accordance with the resilient mirroring principles of operation contemplated by the claimed invention. The method 280 begins with receipt of a write command in block 282. As before, the initial steps of method 280 are the same as those of the method 240 depicted in FIG. 7, and as such they are denoted with like reference numerals. Additionally, the master controller in block 284 journals the write request for use in the event of a crash recovery event.

Further, after obtaining cache lock in block 250 the remote server obtains the write data from the server in block 286. The remote server then transfers the write command and the write data corresponding to the write command to the master controller in block 288. The master controller marks the write data dirty in block 290, and sends a request in block 292 to the remote server to mark the write data dirty, which the remote server does in block 294. This sequence illustrates another operating principle of the resilient mirroring principles of the disclosed embodiments, that the master controller in all instances marks the write data dirty before any remote controller marks the write data dirty.

The master controller clears the journal entry and unlocks cache in block 296, then sends a request in block 298 to the remote controller to unlock cache which the remote server does in block 300. The method is complete at that point on the assumption that the controllers employ write-back caching.

Although the present embodiments have been described with reference to preferred embodiments, workers skilled in the art will recognize that changes may be made in form and detail without departing from the spirit and scope of the invention. It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed:

1. First and second self-contained intelligent storage elements (ISEs) individually connectable in communication with a remote device via a network, each ISE executing resilient mirroring processing instructions stored in a respective memory so that the first ISE, in response to receiving a write command from the remote device for a logical unit (LUN) that is mastered by the second ISE, sends the write command to the second ISE via a peer-to-peer connection existing independently of the second ISE network connection with the remote device, and the first ISE receives a command from the second ISE via the peer-to-peer connection to mark the write data dirty in the first ISE.

2. The first and second self-contained ISEs of claim 1 wherein the first ISE sends a cache lock request to the second ISE to lock a cache in the second ISE.

3. The first and second self-contained ISEs of claim 2 wherein after the first ISE sends the cache lock request to the second ISE, the first ISE subsequently receives a cache lock request from the second ISE to lock a cache in the first ISE.

4. The first and second self-contained ISEs of claim 1 wherein the second ISE marks the write data dirty before the first ISE marks the write data dirty.

5. The first and second ISEs of claim 1 wherein the first ISE subsequently in response to a read command for the LUN sends a request to the second ISE to lock the second ISE cache, and receives a command from the second ISE to lock the first ISE cache.

6. The first and second ISEs of claim 5 wherein the first ISE obtains the read data and sends the read data to the remote device.

7. The first and second ISEs of claim 5 wherein the first ISE sends a read command to the second ISE for the read data.

8. The first and second ISEs of claim 7 wherein the first ISE receives the read data from the second ISE.

9. An apparatus comprising:
a first storage device having a first controller and a second storage device having a second controller, each storage device independently connectable to a remote server via a network; and
resilient mirroring logic stored in each of the storage devices that is executable so that the first storage device, in response to an access command from the remote device for a logical unit (LUN) that is mastered by the second controller, establishes a peer-to-peer communication connection via the network with the second storage device and sends a cache lock request to the second storage device to lock a cache of the second storage device.

10. The apparatus of claim 9 wherein after the first storage device sends the cache lock request to the second storage device, the first storage device subsequently receives a cache lock request from the second storage device to lock a cache of the first storage device.

11. The apparatus of claim 10 wherein the data access command is characterized as a read command, and wherein after the first storage device obtains the cache lock the first storage device obtains the read data from the corresponding LUN and sends the obtained read data to the remote server.

12. The apparatus of claim 11 wherein after the first storage device obtains cache lock the first storage device sends a read request to the second controller to obtain the read data from the corresponding LUN.

13. The apparatus of claim 12 wherein after the first storage device sends the read request the first storage device subsequently receives the read data from the second storage device.

14. The apparatus of claim 10 wherein the data access command is characterized as a write command, and wherein the first storage device after obtaining cache lock sends the write command to the second storage device.

15. The apparatus of claim 14 wherein the second storage device marks the write data dirty.

16. The apparatus of claim 15 wherein the second storage device commands the first storage device to mark the write data dirty.

17. The apparatus of claim 9 wherein at least one of the first and second storage devices is an intelligent storage element.

18. A method comprising:
independently connecting a first self-contained intelligent storage element (ISE) and a second self-contained ISE to a remote device via a network;
receiving a data access command by the first ISE from the remote device via the network connection for a logical unit (LUN) that is mastered accessible by the second ISE;
in response to the receiving step, executing resilient mirroring processing instructions stored in a respective memory within each of the first and second ISEs to establish a peer-to-peer communication connection between the first and second ISEs via the network, the first ISE sending via the peer-to-peer connection a cache lock request to the second storage device to lock a cache of the second storage device.

* * * * *